United States Patent [19]
Amborski et al.

[11] Patent Number: 5,706,657
[45] Date of Patent: Jan. 13, 1998

[54] RIDE CONTROL SYSTEM WITH AN AUXILIARY POWER SOURCE

[75] Inventors: Stephen P. Amborski, Peoria, Ill.; Marc D. Gibson, Greenville, S.C.; Michael E. Green, Cary, N.C.

[73] Assignee: Caterpillar Inc., Peoria, Ill.

[21] Appl. No.: 631,399

[22] Filed: Apr. 12, 1996

[51] Int. Cl.$^6$ .................................................. F16D 31/02
[52] U.S. Cl. .................................................. 60/413; 60/409
[58] Field of Search ............................. 60/413, 420, 421, 60/428, 469

[56] References Cited

U.S. PATENT DOCUMENTS

| | | | |
|---|---|---|---|
| 4,674,280 | 6/1987 | Stuhr | 60/413 |
| 4,738,101 | 4/1988 | Kubik | 60/413 |
| 4,969,562 | 11/1990 | Saotome | 212/261 |
| 5,007,544 | 4/1991 | Saotome et al. | 60/469 X |
| 5,034,892 | 7/1991 | Saotome | 60/469 X |
| 5,147,172 | 9/1992 | Hosseini | 414/719 |
| 5,333,533 | 8/1994 | Hosseini | 91/361 |
| 5,394,991 | 3/1995 | Kumagai et al. | 209/212 |
| 5,520,499 | 5/1996 | Ufheil et al. | 60/413 X |

FOREIGN PATENT DOCUMENTS 58-121305  7/1983  Japan .

*Primary Examiner*—Hoang Nguyen
*Attorney, Agent, or Firm*—J. W. Burrows

[57] ABSTRACT

In machines having a bucket that is capable of carrying a load of material, it is well known that when the machine encounters a bump or other obstacle that the effects thereof may result in machine bounce or the operator is subjected to a jolt due to the sudden change in forces acting on the lift actuator of the lift mechanism. Accumulators have been connected to the loaded end of the actuator to provide a cushion or damping of the sudden changes in the forces. When the machine is being used without the accumulator connected to the loaded end of the actuator, the accumulator is normally connected to the loaded end of the actuator through an orifice in order to maintain a pre-charge in the accumulator equal to the pressure in the loaded end of the actuator. In order to ensure that the pressure in the accumulator is always equal to the pressure in the actuator, the accumulator is selectively connected to an auxiliary source of pressurized fluid. Likewise, in order to ensure that the machine is not subjected to sudden "jerks" or "jolts" when the accumulator is connected to the actuator for ride control, the connection therebetween is interrupted whenever a tilt actuator for the bucket is extended or retracted towards one of its extreme positions. Additionally, when the machine is being operated below a predetermined ground speed, the connection of the accumulator to the lift actuator is interrupted.

9 Claims, 1 Drawing Sheet

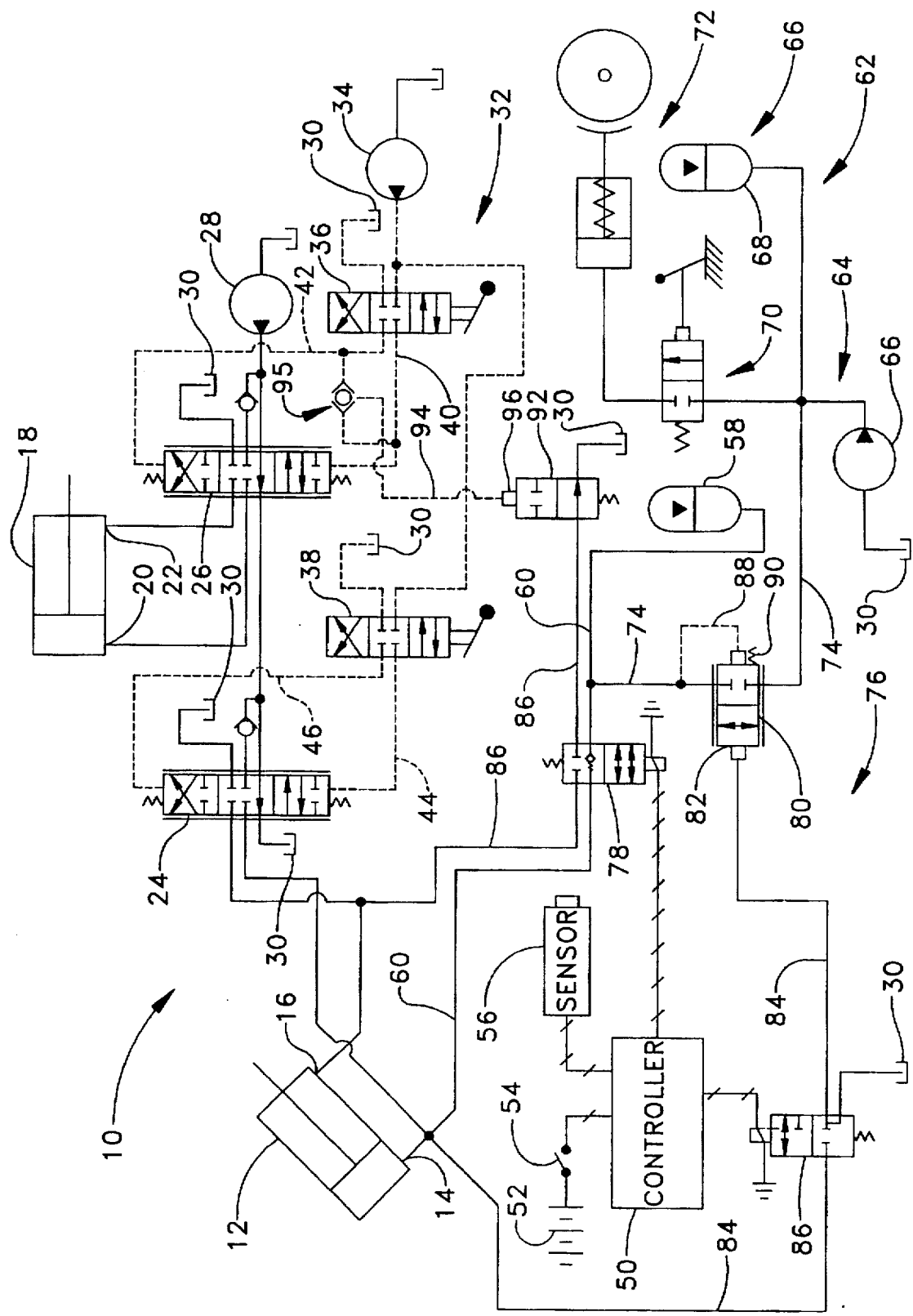

RIDE CONTROL SYSTEM WITH AN AUXILIARY POWER SOURCE

DESCRIPTION

1. Technical Field

This invention relates generally to a ride control system and more particularly to a ride control system that has an auxiliary power source to ensure that power is always available to the ride control system.

2. Background Art

It is well known that when a machine, such as a wheel loader, is being driven for a distance with a loaded bucket there is always the possibility that the vehicle will lope or bounce due to the weight of the loaded bucket reacting to the machine encountering bumps or other obstacles in the pathway thereof. In order to help reduce or eliminate this lope or bounce, it is known to use accumulators that are selectively connected to the lift cylinder actuators. These accumulators, when connected to the loaded end of the actuators, serve to absorb the pressure fluctuations in the actuators thus offsetting the changing forces that would otherwise be acting on the tires of the machine. It is these changing forces acting on the tires of the machine that produces the lope or bounce. In order to maintain a precharge in the accumulator equal to the pressure in the loaded end of the actuators, it is known to connect the accumulator, during normal use, to the loaded end of the lift cylinder actuators. This is normally accomplished by connecting a conduit therebetween. The conduit normally has an orifice therein that is selectably disposed in the conduit when the machine is not operating in the ride control mode. It has been found that during some situations the accumulator pressure may not be equal to the loaded end of the lift cylinder actuator when the ride control is turned on. Under this situation, the lift cylinder may allow the load to "drop" slightly or "jump" thus adding to the problem of machine bounce or subjecting the machine to a "jolt". Furthermore, it has been found that in previous systems, the ride control is always functional, once turned on, even though operating conditions may be best served if the ride control was turned off. Likewise, it has been found that in machine systems having other circuits, such as bucket tilt circuits, that are mechanically interrelated with the lift mechanism, operation of the tilt circuit may also cause the lift cylinder actuator to "jerk or jump" when the bucket reaches one of its extreme dump or rackback positions.

The present invention is directed to overcoming one or more of the problems as set forth above.

DISCLOSURE OF THE INVENTION

In one aspect of the present invention, a ride control system is provide for use on a machine having a frame with a lift mechanism operative through an actuator to raise a bucket relative to the frame. The actuator has first and second ports and is operative to raise and lower the bucket in response to pressurized fluid being selectively directed to and from the respective ports thereof from a directional control valve that is connected to a source of pressurized fluid and a reservoir. An accumulator arrangement is operatively connected to the first port of the actuator. The ride control system comprises a first valve mechanism operatively disposed between the accumulator arrangement and the first port of the actuator. The first valve mechanism is movable between a spring biased first position at which communication is controllably permitted from the accumulator arrangement to the first port of the actuator and a second position at which open communication therethrough is permitted. A second source of pressurized fluid is connected to the accumulator arrangement at a point between the accumulator arrangement and the first valve mechanism. A second valve mechanism having an actuating member is operatively disposed between the second source of pressurized fluid and the point of connection of the second source of pressurized fluid with the accumulator. The second valve mechanism is movable from a first position at which flow from the second source of pressurized fluid to the accumulator arrangement is blocked toward a second position at which the flow therebetween is open. The second valve mechanism is biased to the first position responsive to the pressure in the accumulator arrangement and moveable toward the second position in response to the pressure of the fluid in the first port of the actuator acting on the actuating member thereof. A controller is provided and connected to the first valve mechanism and selectively operative to move the first valve mechanism from its first position to its second position in order to provide ride control.

The intent of the subject invention is to provide a ride control system that is effective to eliminate any "drop" or "jump" when the ride control is activated, thus reducing the shock loads that are many times subjected to the machine from the load in the bucket. Also the subject ride control system automatically turns off if the machine dropped below a predetermined speed level and re-engages once the speed level increases beyond the predetermined level. Likewise, the ride control system eliminates the "jerk or jolt" to the machine when another circuit on the machine is operated to tilt the bucket to one of its extremes positions.

BRIEF DESCRIPTION OF THE DRAWINGS

The drawing illustrates a partial schematic and a partial diagrammatic representation of a machine control system incorporating an embodiment of the subject invention.

BEST MODE FOR CARRYING OUT THE INVENTION

Referring to the drawing, a control system 10 is illustrated for use on a machine (not shown) having a lift and tilt mechanism for controlling movement of a bucket or the like. A first actuator, such as a lift actuator 12, having first and second ports 14,16 controls the raising and lowering of the bucket. A second actuator, such as a tilt actuator 18, having first and second ports 20,22 controls tilting the bucket forwardly (dump) or rearwardly (rackback).

The control system 10 further includes a first directional control valve 24 operative to control movement of the lift actuator 12, a second directional control valve 26 operative to control movement of the tilt actuator 18, a source of pressurized fluid, such as a pump 28, and a reservoir 30 that serves as the source of fluid for the pump 28 and as a container for the fluid returned from the first and second actuators 12,18. A pilot control arrangement 32 is provided for controlling movement of each of the first and second directional control valves 24,26 in a well known manner. The pilot control arrangement 32 includes a pilot pump 34, first and second manually operated pilot valves 36,38 that are operatively connected by respective conduits 42,44,46, 48 to opposite ends of the first and second directional control valves 24,26 in a conventional manner. It is recognized that manually actuated or remotely actuated electrically controlled valves could be used to control movement of the respective first and second directional control valves without departing from the essence of the invention.

The machine system 10 also includes a controller 50, a source of electrical energy 52, a switch 54 for turning the ride control on or off, and a ground speed sensor 56 that is operative to sense the speed of the machine relative to the ground and direct a signal representative thereof to the controller 50.

An accumulator arrangement, such as an accumulator 58, is provided and connected to the first port 14 of the lift actuator 12 by a conduit 60. Even thought only one accumulator 58 is illustrated and described, more than one could be used and connected in parallel. The accumulator 58 is operatively connected to the lift actuator 12 so that it remains at the same pressure level as the pressure level in the first port 14 of the lift actuator 12.

A brake circuit 62 is provided in the machine system 10 and includes a second source of pressurized fluid 64, such as a second pump 66 and a second accumulator 68, a brake control valve arrangement 70, and a brake actuator mechanism 72. The brake circuit 62 operates in a conventional manner to control the stopping of the machine as desired. The second source of pressurized fluid 64 is connected to the first accumulator 58 through a conduit 74 and the conduit 60.

A ride control system 76 is provided and includes a first valve mechanism 78 disposed in the conduit 60 between the point of connection with the conduit 74 and the first port 14 of the lift actuator 12 and a second valve mechanism 80 having an actuating member 82 and is disposed in the conduit 74. A conduit 84 connects the actuating member 82 to the first port 14 of the lift actuator 12. A third valve mechanism 86 is disposed in the conduit 84.

The first valve mechanism 78 is a two position valve that is spring biased to the first position. In the first position of the valve mechanism 78 the flow through the conduit 60 is controlled. More specifically, the flow through the first valve mechanism 78 is permitted to flow only from the first accumulator 58 to the first port 14 of the lift actuator 12. Additionally, a conduit 86 passes through the first valve mechanism 78 and is connected between the second port 16 of the lift actuator 12 and the reservoir 30. In the first position of the first valve mechanism 78, flow through the conduit 86 is blocked. The first valve mechanism 78 is movable to the second position in response to receipt of an electrical signal from the controller 50. In the second position of the first valve mechanism 78, flow through the conduits 60,86 is open.

The second valve mechanism 80 is a two position valve and urged to the first position in response to the pressure of the fluid in the first accumulator 58 directed to one end thereof opposite the actuating member 82 through the pilot line 88. In the first position of the second valve mechanism 80, flow through the conduit 74 is blocked. As illustrated in the drawing, a light force spring 90 also operates to urge the second valve mechanism 80 towards its first position. It is recognized that the spring 80 could be eliminated if desired. The second valve mechanism 80 is urged towards its second position responsive to pressurized fluid from the first port of the lift actuator 12 being directed to the actuating member 82 thereof. In the second position of the second valve mechanism 80 fluid flow through the conduit 74 is open. It is recognized that the second valve mechanism 80 variably controls fluid flow therethrough depending on its position between fully closed, first position and fully open, second position.

The third valve mechanism 86 is a two position valve that is spring biased to the first position. In the first position thereof, the flow through the conduit 84 between the actuating member 82 and the first port 14 of the lift actuator 12 is blocked while the flow through a portion of the conduit 84 between the actuating member 82 and the reservoir 30 is open. The third valve mechanism 86 is moved to the second position in response to receipt of an electrical signal from the controller 50. In the second position of the third valve mechanism 86, flow through the conduit 84 is open between the actuating member 82 and the first port 14 of the lift actuator 12.

A fourth valve mechanism 92 is disposed in the conduit 86 between the first valve mechanism 78 and the reservoir 30. A conduit 94 connects an actuating member 96 of the fourth valve mechanism 92 to the pilot conduits 40,42 through a resolver valve 95. The fourth valve mechanism 92 is a two position valve that is spring biased to its first position. In the first position of the fourth valve mechanism 92, fluid flow in the conduit 86 passes freely through to the reservoir 30. The fourth valve mechanism 92 is moved to its second position in response to pressurized fluid in one of the conduits 40,42 being directed through the resolver valve 95 to the actuating member 96 thereof. In the second position thereof, fluid flow therethrough to the reservoir 30 is blocked.

It is recognized that various forms of the subject control system 10 could be utilized without departing from the essence of the invention. For example, even though each of the first, third and fourth valve mechanisms 78,86,92 are illustrated and described as being electrically actuated by a signal from the controller 50, they each could be actuated manually, hydraulically or by other forms such as air. Likewise, the first, second, third and fourth valve mechanisms 78,80,86,92 could be packaged together into one manifold unit. Additionally, the one-way check valve in the first position of the first valve mechanism 78 could possibly be replaced with an orifice. Likewise, even though the second source of pressurized fluid 64 is from a brake circuit 62, the second source of pressurized fluid 64 could be from an independent pump or from a steering circuit or any other circuit in the system capable of producing the pressure needed to pre-charge the first accumulator to the level of pressure in the first port 14 of the lift actuator 12. It is also recognized that the force from the spring 90 could be used to ensure that the pressure in the accumulator 58 is not equal to the pressure at the first port 14 without departing from the essence of the invention.

INDUSTRIAL APPLICABILITY

During loading of the bucket, the operator would not want the ride control system turned on. It is desirable to have positive control over the stiffness of the lift actuator 12 while filling the bucket. After the bucket is filled and raised to the desired level for travel, the first directional control valve 24 is returned to its centered position. As is well known, when the first directional control valve 24 is in its centered position, the first and second ports 14,16 of the lift actuator 12 are blocked from both the source of pressurized fluid 28 and the reservoir 30. Therefore, the first actuator 12 is hydraulically locked and cannot move. It is recognized that any leakage between the first and second ports 14,16 across the internal mechanism could allow a very slight movement. However, in the subject description, slight amounts of leakage are being ignored.

When the ride control is not engaged, it is necessary to ensure that the pre-charge in the accumulator 58 is equal or nearly equal to the pressure in the first port 14 of the lift actuator 12. In order to ensure that the pressure in the accumulator 58 is at the proper level, the controller 50 directs a signal to the third valve mechanism 86 moving it to its second position. In the second position, the pressure in the first port 14 is transmitted through the conduit 84 to the actuating member 82 of the second valve mechanism 80. The pressure of the fluid in the accumulator 58 is transmitted to the end of the second valve mechanism 80 opposite to the actuating member 82 and opposes the force created by the pressure acting on the actuating member 82. If the pressure of the fluid in the conduit 84 from the first port 14 is higher than the pressure in the accumulator 58, the second valve mechanism 80 moves towards its second position to direct pressurized fluid from the second source of pressurized fluid 64 to the accumulator 58. As the pressure in the accumulator 58 increases, the pressure acting on the end of the second valve mechanism 80 increases. Pressurized fluid from the second source of pressurized fluid 64 continues to be directed to the accumulator 58 until the sum of the forces of the spring 90 and the force created by the pressure of the accumulator 58 acting on the end of the second valve mechanism 80 equals the force created by the pressure from the first port 14 acting on the actuating member 82. The pressure in the first port 14 is a pressure established by the weight of the material in the bucket and the weight of the bucket and associated components. The second valve mechanism 82 maintains a position to ensure that the pressure in the accumulator 58 is equal to the pressure in the first port 14 of the lift actuator 12. With the first valve mechanism 78 in its first position, the pre-charge in the accumulator 58 is connected across the one-way check valve located in first valve mechanism 78 with the first port 14 of the lift actuator 12. Consequently, the pre-charge in the accumulator 58 is always maintained equal to the pressure in the first port 14 when the ride control is not turned on.

In the operation of the ride control system 76, the ride control is turned on by engaging the switch 54. It is recognized that other forms of engaging the ride control could be utilized. Once the switch 54 is turned on, the controller 50 first determines if the speed of the machine is above the predetermined speed level, if the speed criteria is satisfied, then the controller 50 directs a signal to the first valve mechanism 78 moving it to its second position. Simultaneously, the signal from the controller 50 to the third valve mechanism 86 is terminated thus allowing it to return to its first, flow blocking position. With the third valve mechanism 86 in its first position the pressure acting on the actuating member 82 is vented to the reservoir 30 thus allowing the second valve mechanism 80 to move to its first, flow blocking position. With the first valve mechanism in its second, free flow position, any movement of the bucket is cushioned by flow from the first port 14 being directed to the accumulator 58. Consequently, the force of the load is not transferred to the frame of the machine to cause a "jolt" thereto and subsequently to the wheels which would cause the machine to bounce. Likewise, when the ride control is turned on, there is no "sag" or "jerk" of the lift actuator 12 since the pressure level in the first port 14 is the same as the pressure in the accumulator 58.

If the ground speed of the machine drops below the predetermined level as sensed by the sensor 56, the controller automatically terminates the signal to the first valve mechanism 78 and directs a signal to the third valve mechanism 86 to maintain the precharge in the accumulator 58 equal to the pressure in the first port 14 of the lift actuator 12. Once the speed increases above the predetermined speed level, the controller 50 directs the signal to the first valve mechanism 78 and terminates the signal to the third valve mechanism 86 to re-activate the ride control.

When the ride control is on and active, any efforts by the operator to move the bucket to one of its extreme positions automatically inhibits any tendency for the lift actuator 12 to "jump" or raise since the fourth valve mechanism 92 moves to its second flow blocking position. With the flow path from the second port 16 of the lift actuator 12 blocked from the reservoir 30, the lift actuator 12 cannot "jump" or raise. Furthermore, as is well known, the lift actuator 12 cannot "sag" or retract since there is no flow path for fluid to fill the void in the second port 16 if it attempts to "sag" or retract.

From a review of the above, it should be apparent that the ride control system 76 controls "jolts" subjected to the machine and bouncing of the machine that are created by the machine encountering bumps in the roadway or other obstacles. Likewise, the ride control system controls any tendency of the lift actuator 12 to "sag" or "jerk". The subject invention ensures that the pre-charge pressure in the accumulator 58 remains equal to the pressure in the first port 14 of the first actuator 12 by using the second valve mechanism 80 to variably control pressurized fluid from a second source of pressurized fluid 64 to maintain the pressure in the accumulator 58 at the proper level. Furthermore, if the machine ground speed drops below a predetermined level, the ride control is automatically interrupted until the ground speed increases to a level above the predetermined speed. This would be characteristic of a machine traveling to a stockpile of material at some travel speed above the predetermined speed level and slowing down below the predetermined speed level when loading the bucket from the stockpile and once again increasing travel speed to move the material to another location.

Other aspects, objects and advantages of the invention can be obtained from a study of the drawings, the disclosure and the appended claims.

We claim:

1. A ride control system adapted for use on a machine having a frame with a lift mechanism operative through an actuator to raise a bucket relative to the frame, the actuator having first and second ports and operative to raise and lower the bucket in response to pressurized fluid being selectively directed to and from the respective ports thereof from a directional control valve that is connected to a source of pressurized fluid and a reservoir, and an accumulator arrangement connected to the first port of the actuator, the ride control system comprising:

a first valve mechanism operatively disposed between the accumulator arrangement and the first port of the actuator, the first valve mechanism being movable between a spring biased first position at which communication is controllably permitted from the accumulator arrangement to the first port of the actuator and a second position at which open communication therethrough is permitted;

a second source of pressurized fluid connected to the accumulator arrangement at a point between the accumulator arrangement and the first valve mechanism;

a second valve mechanism operatively disposed between the second source of pressurized fluid and the point of connection of the second source of pressurized fluid with the accumulator, the second valve mechanism has an actuating member and is movable from a first position at which flow from the second source of pressurized fluid to the accumulator arrangement is blocked towards a second position at which the flow therebetween is open, the second valve mechanism is biased to the first position responsive to the pressure in the accumulator arrangement and moveable toward the second position in response to the pressure of the fluid in the first port of the actuator acting on the actuating member thereof; and a controller connected to the first valve mechanism and selectively operative to move the first valve mechanism from its first position to its second position in order to provide ride control.

2. The ride control system of claim 1 wherein a third valve mechanism is operatively disposed between the actuating member of the second valve mechanism and the first port of the actuator, the third valve mechanism is movable from a spring biased first position at which the pressurized fluid in the first port of the actuator is blocked from the actuating member of the second valve mechanism and the actuating member of the second valve mechanism is connected with the reservoir and a second position at which the first port of the actuator is in open communication with the actuating member of the second valve mechanism.

3. The ride control system of claim 2 wherein the third valve mechanism is movable to its second position responsive to receipt of a signal from the controller.

4. The ride control system of claim 3 including a ground speed sensor operative to sense the speed of the machine relative to the ground and deliver a signal representative thereof to the controller, the controller automatically interrupts the to the first valve mechanism to turn off the ride control system in the event the speed of the vehicle drops below a predetermined speed level.

5. The ride control system of claim 4 including a brake circuit and the second source of pressurized fluid is the source of pressurized fluid for the brake circuit.

6. The ride control system of claim 1 wherein the second port of the actuator is connected with the reservoir through the first valve mechanism, in the first position of the first valve mechanism, the flow from the second port of the actuator is blocked from the reservoir and in the second position thereof flow between the reservoir and the second port of the actuator is open.

7. The ride control system of claim 6 wherein the machine is adapted to include a tilt mechanism having a tilt actuator with first and second ports, the tilt actuator being operative to tilt the bucket forwardly and rearwardly by receiving fluid through a second directional control valve from the source of pressurized fluid, a fourth valve mechanism is operatively disposed between the reservoir and the first valve mechanism and movable between a spring biased first position at which the reservoir is in open communication with the first valve mechanism and a second position at which the fluid flow therethrough is blocked.

8. The ride control system of claim 7 wherein the fourth valve mechanism is movable to its second position responsive to the second directional control valve being moved to one of its operative positions.

9. The ride control system of claim 8 wherein the fourth valve mechanism is moved to its second position in response to the tilt actuator being moved towards one of its extreme dump or rackback positions.

* * * * *

UNITED STATES PATENT AND TRADEMARK OFFICE
CERTIFICATE OF CORRECTION

PATENT NO. : 5,706,657
DATED : January 13, 1998
INVENTOR(S) : Stephen P. Amborski, et al.

It is certified that error appears in the above-identified patent and that said Letters Patent is hereby corrected as shown below:

Column 7, line 27, insert --signal-- after "the" (first occurrence)

Signed and Sealed this

Thirty-first Day of March, 1998

Attest:

BRUCE LEHMAN

Attesting Officer       Commissioner of Patents and Trademarks